(12) United States Patent
Kitami (10) Patent No.: US 7,506,551 B2
(45) Date of Patent: Mar. 24, 2009

(54) CORIOLIS FLOWMETER HAVING A DRIVE DEVICE DRIVEN IN REVERSE PHASE TO PAIR OF SECOND DRIVE DEVICES

(75) Inventor: Hirokazu Kitami, Tokyo (JP)

(73) Assignee: Oval Corporation, Tokyo (JP)

( * ) Notice: Subject to any disclaimer, the term of this patent is extended or adjusted under 35 U.S.C. 154(b) by 0 days.

(21) Appl. No.: 10/581,243

(22) PCT Filed: Sep. 24, 2004

(86) PCT No.: PCT/JP2004/014454

§ 371 (c)(1),
(2), (4) Date: Oct. 3, 2006

(87) PCT Pub. No.: WO2005/054791

PCT Pub. Date: Jun. 16, 2005

(65) Prior Publication Data

US 2007/0095151 A1    May 3, 2007

(30) Foreign Application Priority Data

Dec. 2, 2003   (JP) .............................. 2003-403065

(51) Int. Cl.
*G01F 1/84* (2006.01)
(52) U.S. Cl. ................................. 73/861.355
(58) Field of Classification Search ................................
73/861.355–861.357
See application file for complete search history.

(56) References Cited

U.S. PATENT DOCUMENTS

| | | | | |
|---|---|---|---|---|
| 5,497,666 A | * | 3/1996 | Patten et al. | 73/861.355 |
| 5,734,112 A | * | 3/1998 | Bose et al. | 73/861.356 |
| 6,092,429 A | * | 7/2000 | Cunningham et al. | 73/861.356 |
| 6,412,354 B1 | * | 7/2002 | Birchak et al. | 73/861.356 |
| 7,168,329 B2 | * | 1/2007 | Bell et al. | 73/861.355 |
| 2007/0000334 A1 | * | 1/2007 | Bitto et al. | 73/861.356 |

FOREIGN PATENT DOCUMENTS

| JP | 08-082541 | 3/1996 |
|---|---|---|
| JP | 11-023341 | 1/1999 |
| JP | 2884796 | 4/1999 |

* cited by examiner

*Primary Examiner*—Harshad Patel
(74) *Attorney, Agent, or Firm*—Wenderoth, Lind and Ponack, L.L.P.

(57) ABSTRACT

A flow tube composed of a bent tube having a shape symmetrical with respect to a first axis is supported at its both ends by support portions having an outlet and inlet respectively. A drive device for alternately driving the flow tube rotationally about a second axis connecting the positions where the flow tube is supported is disposed on the vertical axis of a Coriolis flowmeter. A Pair of second drive devices for alternately driving the flow tube rotationally is disposed at positions laterally symmetrical with respect to the drive device. The paired second drive devices are driven in phase; the drive device is driven with the opposite phase to those of the second drive devices. A pair of vibration detecting sensors is disposed between the drive device and one of the second drive device and between the drive device and the other respectively. The sensors detect vibrations with phases the difference between which is in proportion to the Coriolis force acting on the flow tube disposed laterally symmetrically with respect to the drive device.

13 Claims, 5 Drawing Sheets

(a) BENDING VIBRATION VELOCITY (b) CORIOLIS FORCE

FIG. 7

CORIOLIS FLOWMETER HAVING A DRIVE DEVICE DRIVEN IN REVERSE PHASE TO PAIR OF SECOND DRIVE DEVICES

BACKGROUND OF THE INVENTION

1. Technical Field

The present invention relates to a Coriolis flowmeter, and more particularly to a Coriolis flowmeter including at least one flow tube constructed of a bent tube.

2. Background Art

In a Coriolis flowmeter, a tube through which a fluid to be measured flows is supported at one end or both ends thereof, and vibration is applied to a portion of the tube around the supporting point in a direction perpendicular to the flowing direction of the tube (hereinafter, a tube to which vibration is applied is referred to as a flow tube). The Coriolis flowmeter is a mass flowmeter, which utilizes the fact that the Coriolis forces applied to the flow tube when vibration is thus applied thereto, are proportional to a mass flow rate. The Coriolis flowmeter, which is well known, is roughly classified into two types in terms of flow tube structure: a straight tube type and a bent tube type.

In a Coriolis flowmeter of the straight tube type, when vibration is applied to a straight tube, whose both ends are supported, in a direction perpendicular to the straight-tube center portion axis, a difference in displacement due to the Coriolis forces is generated between the support portions and the central portion of the straight tube (that is, a phase difference signal is obtained), and, based on this phase difference signal, the mass flow rate is detected. The straight tube type Coriolis flowmeter thus constructed has a simple, compact, and solid structure. On the other hand, there arises a problem in that it is difficult to achieve high detection sensitivity.

In contrast, the bent tube type Coriolis flowmeter is superior to the straight tube type Coriolis flowmeter from a view point that it allows selection of a shape for effectively obtaining the Coriolis forces. In fact, it is capable of performing mass flowrate detection with high sensitivity. Known examples of the bent tube type Coriolis flowmeter include one equipped with a single flow tube (see, for example, JP 4-55250 B), one equipped with two flow tubes arranged in parallel (see, for example, JP 2939242 C), and one equipped with a single flow tube in a looped state (see, for example, JP 2951651 C).

However, of bent tube type Coriolis flowmeters, one with a single flow tube is advantageously capable of providing a mass flowmeter in the simplest structure and at low cost. On the other hand, it has the following problem. Since there is provided only one flow tube, when vibrating the flow tube, it is impossible to secure the vibration balance as in the case of a flowmeter with two flow tubes, making it impossible to obtain a stable signal.

SUMMARY OF THE INVENTION

It is an object of the present invention to provide a Coriolis flowmeter, which can be realized in a simple construction and at low cost and is capable of obtaining a stable signal when vibrating the flow tube.

To achieve the object of the present invention, the Coriolis flowmeter of the present invention is characterized by including: at least one flow tube constructed of a bent tube of a symmetrical shape with respect to a first axis and supported at support portions at both ends in which inflow and outflow ports are formed; a drive device adapted to alternately drive the flow tube in a rotating direction around a second axis connecting positions supported at the support portions at both ends; and a pair of vibration detecting sensors mounted at symmetrical positions to the right and left of the drive device and adapted to detect a phase difference that is proportional to Coriolis forces acting on the flow tube. The drive device is arranged in the first axis, there being further provided a pair of second drive devices adapted to alternately drive the flow tube in the rotating direction and arranged at symmetrical positions to the right and left of the drive device. The pair of second drive devices are driven in phase with each other, with the drive device and the pair of second drive devices being driven in a reverse phase with each other.

With this construction, according to the Coriolis flowmeter of the present invention, when the drive device and the pair of second drive devices are driven, vibration beam in a tertiary vibration mode may be provided to the flow tube. In other words, a pair of second drive devices are driven in phase, whereas the drive device and the pair of second drive devices are driven in a reverse phase, so the flow tube may obtain the vibration beam in the tertiary vibration mode. As compared with the case in which no such pair of second drive devices exist and in which only the drive device is used, in the flow tube of the Coriolis flowmeter of the present invention, the vibration of the flow tube is far more stabilized, with the result that the signals obtained through the pair of vibration detecting sensors are stabilized. As can be seen from the structure described above, the Coriolis flowmeter of the present invention provides a mass flowmeter in a simple structure and at low cost.

To achieve the object of the present invention, according to the Coriolis flowmeter of the present invention, the vibration detecting sensors are arranged between the drive device and the pair of second drive devices. Further, to achieve the object of the present invention, according to the Coriolis flowmeter of the present invention, in the Coriolis flowmeter of the present invention, the pair of vibration detecting sensors are arranged between the pair of second drive devices and the support portions having the inflow and outflow ports of the flow tube.

With such the construction, according the present invention, the arrangement of the pair of vibration detecting sensors allows appropriate selection, and it is possible to detect the phase difference, which is proportional to the Coriolis forces acting on the flow tube, at a more desirable position.

To achieve the object of the present invention, according to the Coriolis flowmeter of the present invention, the flow tube is formed in a gate-shape having a straight portion and a pair of leg portions connected to the ends of the straight portions, and the drive device and the pair of second drive devices are arranged along the straight portion. With this construction, according to the Coriolis flowmeter of the present invention, it is possible to further stabilize the vibration of the flow tube.

To achieve the object of the present invention, according to the Coriolis flowmeter of the present invention, the vibration detecting sensors are equipped with coils and magnets, the coils are arranged on a stationary member parallel to the flow tube, and the magnets are arranged on the flow tube. With this construction, according to the present invention, no coil requiring wiring is mounted to the flow tube, so the influence on the vibration of the flow tube is mitigated as much as possible.

According to the present invention, the flow tube may obtain the vibration beam in a tertiary vibration mode, whereby it is possible to markedly stabilize the vibration of the flow tube as compared with the prior-art technique. Thus, it is possible to provide a Coriolis flowmeter capable of obtaining a stable signal through the vibration detecting sensor, which is advantageous. Further, since it is a Coriolis flowmeter equipped with at least one flow tube constructed of bent tube, it is possible to provide a Coriolis flowmeter in a simple structure and at relatively low cost.

According to the present invention, the vibration detecting sensor is provided between the drive device and the second drive devices, or between the second drive devices and the inflow and outflow ports, so it is possible to detect the phase difference, which is proportional to the Coriolis forces acting on the flow tube, at a more desirable position.

According to the present invention, there is adopted a gate-shaped flow tube, along the straight line portion of which the drive device and the second drive devices are arranged, whereby it is possible to further stabilize the vibration of the flow tube.

According to the present invention, a coil requiring wiring is arranged on a stationary member parallel to the flow tube, and a magnet is arranged on the flow tube, so the influence on the vibration of the flow tube can be mitigated as much as possible.

DETAILED DESCRIPTION OF THE PRESENT INVENTION

Embodiments of the present invention will now be described with reference to the drawings.

Figure 1:
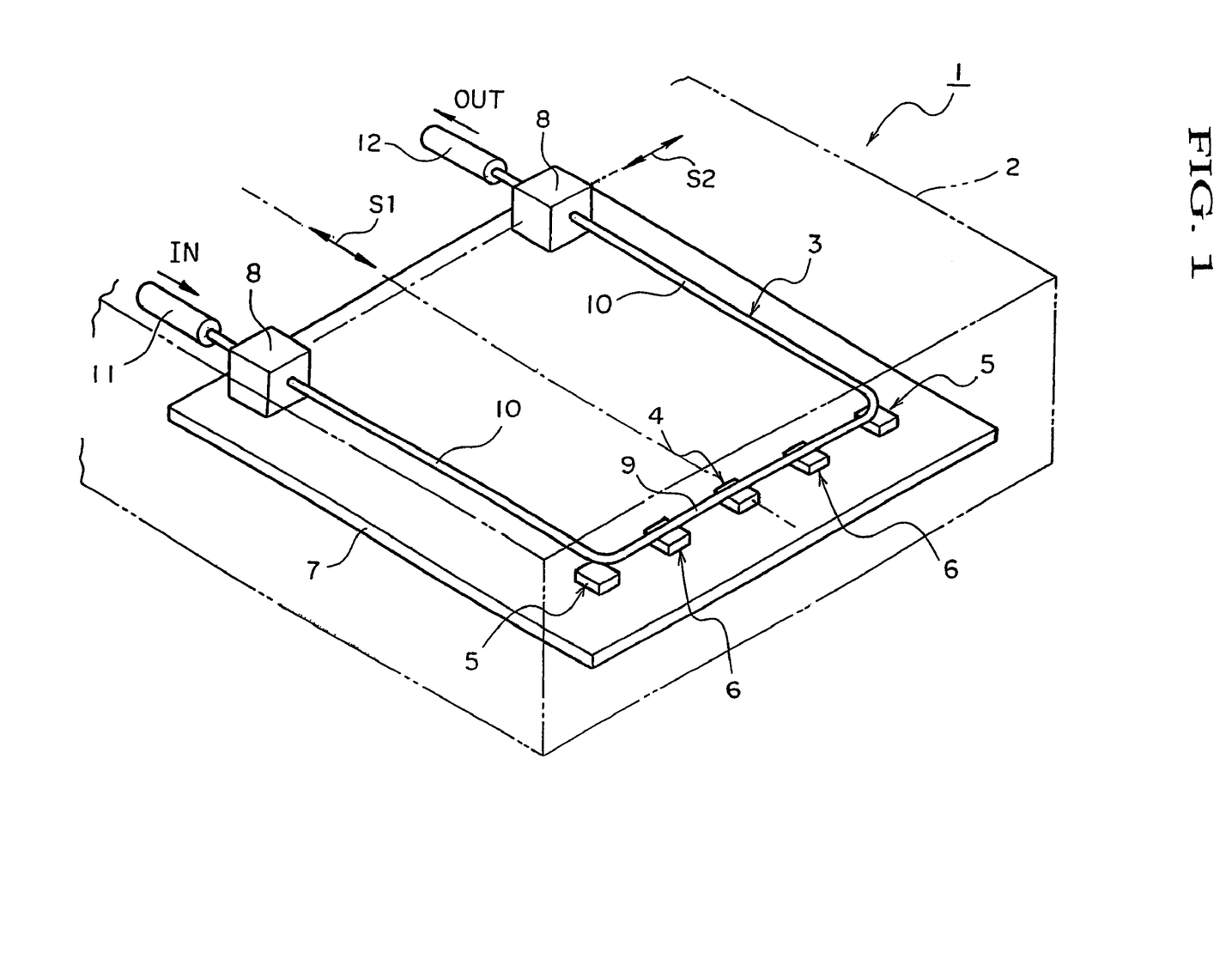
FIG. 1 is a perspective view of a Coriolis flowmeter according to an embodiment of the present invention.

In FIG. 1, a Coriolis flowmeter according to a first embodiment of the present invention is shown.

Of the drawings, FIG. 1 is a perspective view of a Coriolis flowmeter according to an embodiment of the present invention.

In FIG. 1, a Coriolis flowmeter 1 according to the first embodiment of the present invention includes a casing 2, a single flow tube 3 accommodated in the casing 2, a drive device 4 and a pair of second drive devices 5, 5 for driving the flow tube 3, and a pair of vibration detecting sensors 6, 6 for detecting a phase difference proportional to Coriolis forces acting on the flow tube 3. In the following, those components will be described.

The casing 2 has a structure resistant to bending and torsion. Further, the casing 2 is large enough to be capable of accommodating the flow tube 3 and a stationary member 7 arranged parallel to the plane defined by the flow tube 3 itself. Further, the casing 2 is formed so as to be capable of protecting the flow tube 3, etc., which constitute the main portion of the flowmeter. The casing 2 is filled with an inert gas, such as argon gas. Due to the filling of the casing 2 with an inert gas, in the casing 2, condensation on the flow tube 3, etc. is prevented.

The stationary member 7 has, for example, a rectangular shape in plan view, and is formed as a flat plate as shown in the figure. The stationary member 7 is partially fixed to the casing 2. Further, mounted and fixed to the stationary member 7 are block-shaped support portions 8, 8 for supporting and fixing the flow tube 3. The Coriolis flowmeter 1 of the present invention has a structure which involves no amplification of disturbance vibration and which does not easily allow vibration to be transmitted to the flow tube 3 through the support portions 8, 8.

The flow tube 3 is constructed of a bent tube which is symmetrical with respect to a first axis indicated by reference numeral S1 of FIG. 1 (which coincides with the vertical axis of the Coriolis flowmeter 1), and the inflow port side and the outflow port side thereof are fixed to the support portions 8, 8. The flow tube 3 is formed in a gate-like shape, and has a straight portion 9 and a pair of leg portions 10, 10 connected to the ends of the straight portion 9 thereof. The material of the flow tube 3 is one usually adopted in this technical field, such as stainless steel, hastelloy, or titanium alloy. Further, mounted to the inflow and outflow ports of the flow tube 3 are an inflow port side connecting portion 11 and an outflow port side connecting portion 12. Measurement fluid flows into the flow tube 3 from the direction of the arrow IN of FIG. 1 through the inflow port side connecting portion 11 and the inflow port, and sequentially flows through the inflow port side leg portion 10, the straight portion 9, and the outflow port side leg portion 10 before flowing out through the outflow port and the outflow port side connecting portion 12 (as indicated by the arrow OUT).

Although not shown specifically, the drive device 4 for vibrating the flow tube 3 so as to form the vibration beam in the tertiary vibration mode is equipped with a coil and a magnet. Further, the drive device 4 is arranged in the first axis S1. To be more specific, it is arranged at the center position of the straight portion 9 of the flow tube 3 and along the flow path center axis. Further, the coil of the drive device 4 is mounted to the stationary member 7 and the magnet of the drive device 4 is mounted to the flow tube 3 with, for example, a dedicated mounting member.

Here, when an attracting action is generated in the drive device 4, the magnet is inserted into the coil. As a result, the flow tube 3 is brought close to the stationary member 7. In contrast, when a repelling action is generated in the drive device 4, the flow tube 3 is moved away from the stationary member 7.

Since the flow tube 3 is fixed to the support portions 8, 8, the drive device 4 is adapted to alternately drive the flow tube 3 in the rotating direction around a second axis S2 connecting the support portions 8, 8 (an axis parallel to the horizontal axis).

Like the drive device 4, each of the pair of second drive devices 5, 5 is equipped with a coil and a magnet. The pair of second drive devices 5, 5 are arranged symmetrically to the right and left of the drive device 4. In this embodiment, the pair of second drive devices 5, 5 are arranged near the apexes of the rising portion and the falling portion of the straight portion 9 of the flow tube 3 and along the flow path center axis of the flow tube 3. In this way, the pair of second drive devices 5, 5 and the drive device 4 are arranged in a lateral row along the straight portion 9 of the flow tube 3. Further, they are arranged at predetermined intervals. The respective coils of the pair of second drive devices 5, 5 are mounted to the stationary member 7. Each of the magnets of the pair of second drive devices 5, 5 are mounted to the flow tube 3.

The pair of second drive devices 5, 5 are set so as to be driven in phase with each other. Further, the pair of second drive devices 5, 5 and the drive device 4 are set so as to be driven in a reverse phase with each other. Thus, when an attracting action is generated in the pair of second drive devices 5, 5, the magnets are inserted into the coils. As a result, the flow tube 3 is brought close to the stationary member 7 (at this time, a repelling action is generated in the drive device 4). In contrast, in the drive device 4, when a repelling action is generated, the flow tube 3 is moved away from the stationary member 7 (at this time, an attracting action is generated in the drive device 4). In this way, like the drive device 4, the pair of second drive devices 5, 5 are adapted to alternately drive the flow tube 3 in the rotating direction.

As stated above, the pair of vibration detecting sensors 6, 6 are adapted to detect a phase difference which is proportional to the Coriolis forces acting on the flow tube 3; each of them is equipped with a coil and a magnet (to form a velocity detection system). Further, the pair of vibration detecting sensors 6, 6 are arranged symmetrically to the right and left of the drive device 4. In this embodiment, the pair of vibration detecting sensors 6, 6 are arranged between the inflow port side second drive device 5 and the drive device 4 and between the outflow port side second drive device 5 and the drive device 4 (the arrangement of the vibration detecting sensors 6, 6, however, should not be construed restrictively). When the flow tube 3 is vibrated, nodes are generated; in this embodiment, the pair of vibration detecting sensors 6, 6 are arranged at positions deviated from a node generated between a portion corresponding to the inflow port side second drive device 5 and a portion corresponding to the drive device 4, and from a node generated between a portion corresponding to the outflow port side second drive device 5 and a portion corresponding to the drive device 4. The respective coils of the pair of vibration detecting sensors 6, 6 are mounted to the stationary member 7. The respective magnets of the pair of vibration detecting sensors 6, 6 are mounted to the flow tube 3.

In the Coriolis flowmeter of the first embodiment of the present invention, the respective coils of the pair of second drive devices 5, 5, the drive device 4, and the pair of vibration detecting sensors 6, 6 have an appropriate weight and also require wiring (graphics of the wiring is omitted) of an FPC (flexible printed circuit) (not shown), so they are mounted at predetermined positions on the stationary member 7. In the Coriolis flowmeter of the first embodiment, by mounting coils at predetermined positions on the stationary member 7 as described above, the influence on the vibration of the flow tube 3 is mitigated as much as possible.

It is to be noted that the Coriolis flowmeter of the first embodiment of the present invention does not deny the adoption of a structure in which the mounting of the coils and the magnets are reversed (i.e., the coils are mounted to the flow tube 3 and the magnets are mounted to the stationary member 7) or alternated (e.g., the coil of the drive device 4 is mounted to the stationary member 7 and the magnet of the drive device 4 is mounted to the flow tube 3, or, conversely, the coils of the pair of second drive devices 5, 5 are mounted to the flow tube 3 and the magnets of the pair of second drive devices 5, 5 are mounted to the stationary member 7, etc.). Although not specifically shown, in mounting the magnets to the flow tube 3, a dedicated mounting member is used.

Regarding the operation of the Coriolis flowmeter 1 of the present invention, it will be described below together with the operation of a Coriolis flowmeter 21 according to a second embodiment.

Next, a Coriolis flowmeter according to another embodiment of the present invention will be described with reference to FIGS. 2 through 4.

Figure 2:
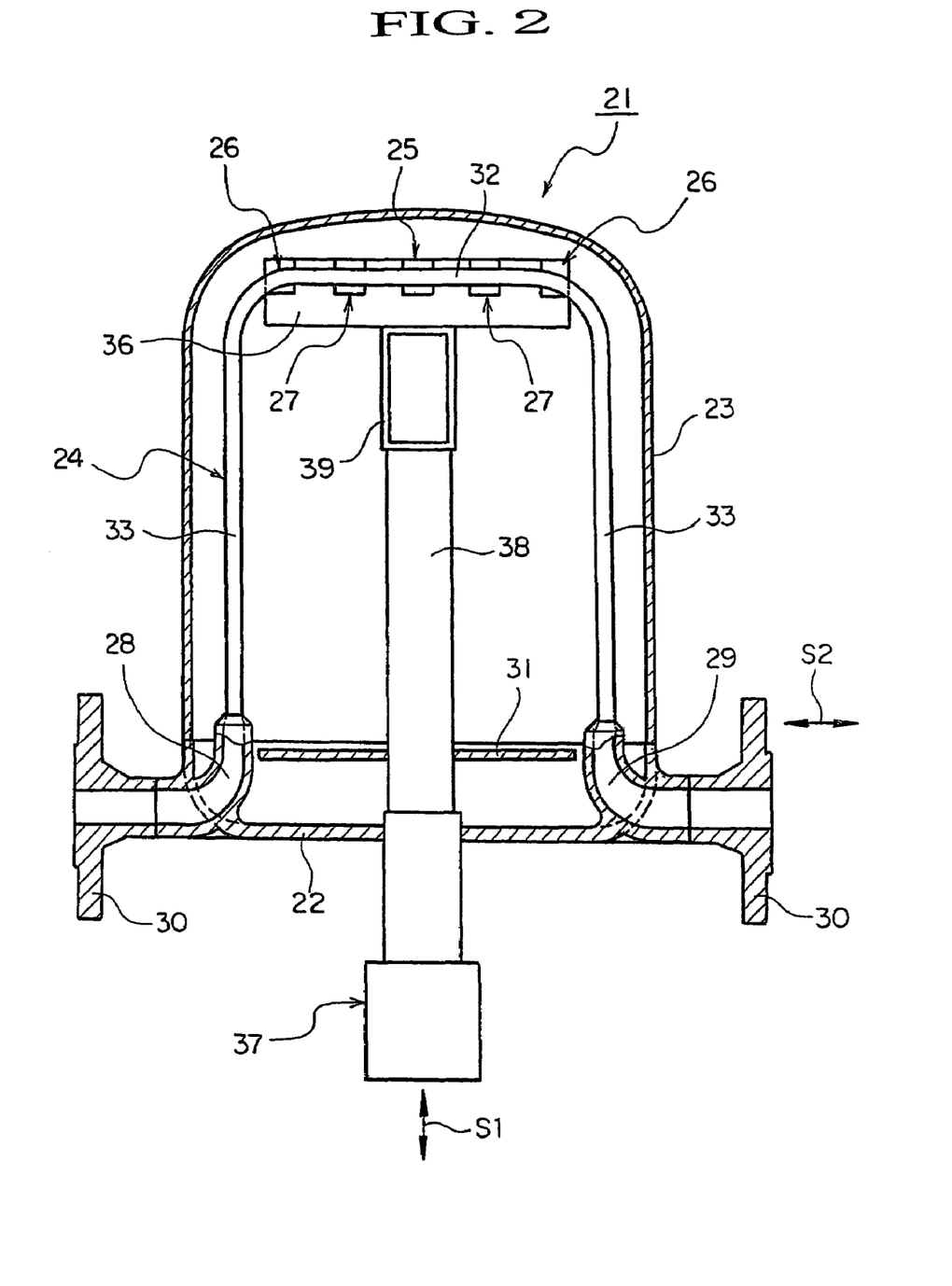
FIG. 2 is a front view of a Coriolis flowmeter according to another embodiment of the present invention, in which a single bent tube type flow tube is mounted in a vertical plane.

FIG. 2 shows a Coriolis flowmeter according to a second embodiment of the present invention.

Of the drawings, FIG. 2 is a front view of a Coriolis flowmeter according to an embodiment of the present invention, in which a single bent tube type flow tube is mounted in a vertical plane. FIG. 3 is a top view of the Coriolis flowmeter shown in FIG. 2; and FIG. 4 is a sectional view, as taken along a line near its center, of the Coriolis flowmeter shown in FIG. 2.

Figure 3:
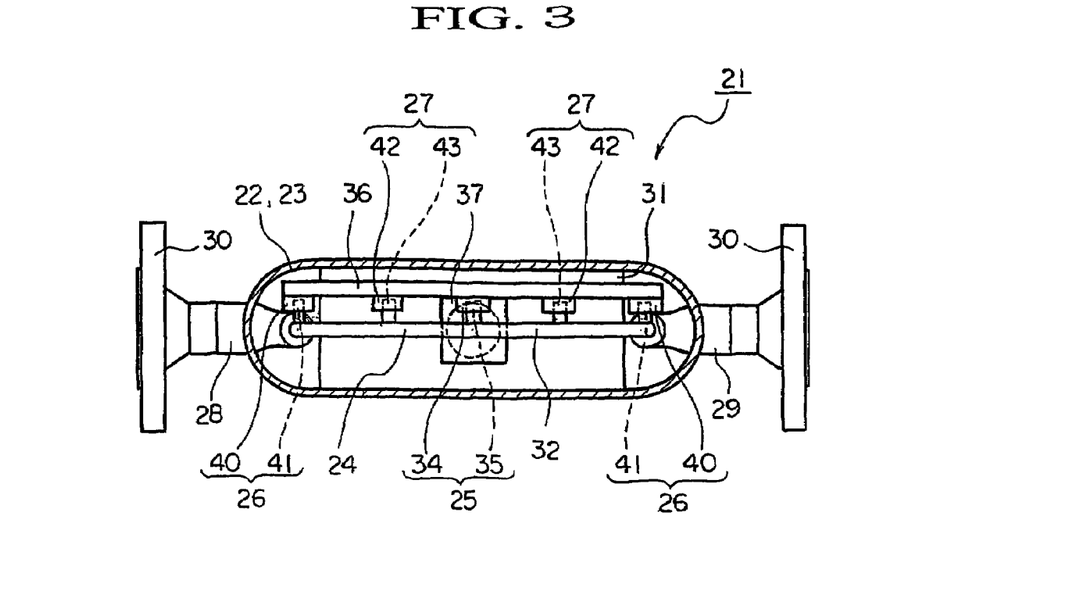
FIG. 3 is a top view of the Coriolis flowmeter shown in FIG. 2.
Figure 4:
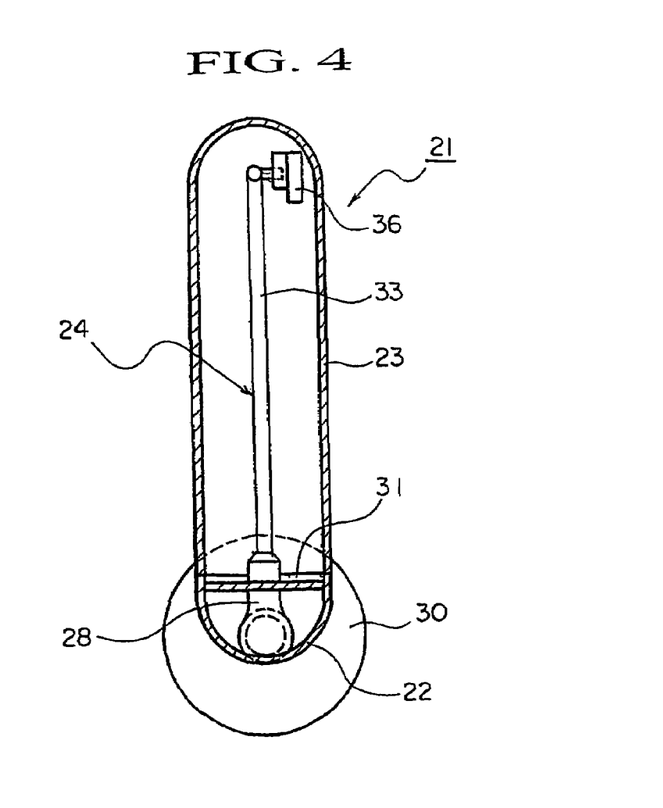
FIG. 4 is a sectional view, as taken along the line near its center, of the Coriolis flowmeter shown in FIG. 2.

In FIGS. 2 through 4, a Coriolis flowmeter 21 according to the second embodiment of the present invention includes a main body 22 and a pressure-resistant case 23 forming a casing, a single flow tube 24 accommodated in the casing, a drive device 25 and a pair of second drive devices 26 for driving the flow tube 24, and a pair of vibration detecting sensors 27, 27 for detecting a phase difference that is proportional to the Coriolis forces acting on the flow tube 24. In the following, these components will be described.

The main body 22 is substantially in a bilge-like shape with a U-shaped section and an open upper surface. The main body 2 of this shape has a structure resistant to bending and torsion; connected to its ends in the longitudinal direction (i.e., in FIG. 2, coincides with the lateral direction of FIG. 2) are an inflow port side connecting portion 28 and an outflow port side connecting portion 29. The inflow port side connecting portion 28 and the outflow port side connecting portion 29 are formed so as to establish communication between the interior and the exterior of the main body 22. Further, the inflow port side connecting portion 28 and the outflow port side connecting portion 29 have arcuate portions, by means of which it is possible to change the flowing direction of the measurement fluid by 90 degrees. Further, mounted to the inflow port side connecting portion 28 and the outflow port side connecting portion 29 are flanges 30, 30 for connecting, outside the main body 22, external flow tubes through which the measurement fluid flows. In this embodiment, it is to be assumed that the measurement fluid flows in from the left-hand side and flows out from the right-hand side of FIG. 2. Further, a base plate 31 is provided inside the main body 22 and in the vicinity of the upper surface mentioned above.

The pressure-resistant case 23 has an opening portion mounted to the top surface of the main body 22, and is formed in a U-shaped sectional shape as shown in the figure. Further, the pressure-resistant case 23 is thin-walled, and formed such that the entire outer periphery thereof is of an arcuate shape. Despite the small wall thickness, the pressure-resistant case 23 thus formed ensures a very high level of pressure resistance; if the flow tube 24 is damaged, the measurement fluid flowing through the flow tube 24 does not flow out of the main body 22 and the pressure-resistant case 23 forming the casing. The pressure-resistant case 23 is fixed to the main body 22 by appropriate means, such as welding. Further, the casing, formed of the main body 22 and the pressure-resistant case 23, can protect the main portion of the flowmeter, such as the flow tube 24. Further, the casing, formed of the main body 22 and the pressure-resistant case 23, is filled with an inert gas, such as argon gas. Due to the filling of the casing with this inert gas, condensation on the flow tube 24, etc. is prevented.

The flow tube 24 is constructed of a bent tube which is symmetrical with respect to a first axis S1 shown in FIG. 1 (which coincides with a vertical axis of FIG. 2), and has two opening portions, that is, inflow and outflow ports, supported by and fixed to the inflow port side connecting portion 28 and the outflow port side connecting portion 29. To be more specific, the flow tube 24 has a gate-shape having a straight portion 32 and a pair of leg portions 33, 33 connected to the ends of the straight portion 32, and is fixed to the inflow port side connecting portion 28 and the outflow port side connecting portion 29 through the inflow and outflow ports. The material of the flow tube 24 is one usually adopted in this technical field, such as stainless, hastelloy, or a titanium alloy.

Measurement fluid flows into the flow tube 24 from the inflow port on the left-hand side of FIG. 2 through the inflow port side connection portion 28, and sequentially flows through the left-hand side leg portion 33, the straight portion 32, and the right-hand side leg portion 33 before flowing out through the outflow port on the right-hand side to the outflow port side connecting portion 29. The flow path sectional area of the inflow port side connecting portion 28 continuously decreases until it is matched with the sectional area of the flow tube 24. The flow path sectional area of the out flow port side connecting portion 29 continuously increases from the portion being matched with the sectional area of the flow tube 24 until it is matched with the sectional area of the external flow tube.

The drive device 25 is one for making the flow tube 3 vibrate so as to make a vibration beam in a tertiary vibration mode and is equipped with a coil 34 and a magnet 35. The drive device 25 is provided in the first axis S1. That is, the drive device 25 is provided at the center position of the straight portion 32 of the flow tube 24 and along the flow path center axis. The coil 34 is mounted to a stationary member 36 provided parallel to a plane formed by the flow tube 24. Although not specifically shown, an FPC (flexible printed circuit) is led out from the coil 34, and is connected to a board (not shown) fixed at a predetermined position of a support column 37 described below. The magnet 35 of the drive device 25 is mounted to the flow tube 24 with, for example, a dedicated mounting member.

Here, when an attracting action is generated in the drive device 25, the magnet 35 is inserted into the coil 34. As a result, the flow tube 24 is brought close to the stationary member 36. In contrast, when a repelling action is generated in the drive device 25, the flow tube 24 is moved away from the stationary member 36.

The flow tube 24 is fixed to the inflow port side connecting portion 28 and the outflow port side connecting portion 29, so the drive device 25 is structured so as to alternately drive the flow tube 24 in the rotating direction around a second axis S2 shown in FIG. 2 connecting the inflow port side connecting portion 28 and the outflow port side connecting portion 29 (an axis parallel to the horizontal axis in FIG. 2).

The support column 37 is mounted to the stationary member 36, provided in parallel to the side formed by the flow tube 24 itself, is for wiring to the drive device 25, a pair of second drive devices 26, 26, a pair of vibration detecting sensors 27, 27, and a temperature sensor (not shown), and is provided in the vertical axis of the Coriolis flowmeter 21 which is the same as the first axis S1 shown in FIG. 1. Further, the support column 37 is arranged so as to extend across the interior and exterior of the casing. Formed on the support column 37 are a hollow support column main body 38 and a board fixing portion 39 mounted to an end of the support column main body 38. The above-mentioned board (not shown) is fixed to the board fixing portion 39, and a wire harness (not shown) connected to the board (not shown) is led out through the support column main body 38 via the support column 37. The support column main body 38 is partly sealed together with the wire harness (not shown) by resin molding or the like.

The stationary member 36 is formed, as shown in FIGS. 2 and 3, as a plate, and is fixed, for example, to the upper portion of the board fixing portion 39. The shape of the stationary member 36 is not particularly limited to a plate. That is, the shape of the stationary member 36 is appropriately designed according to the arrangement of the drive device 25, the pair of second drive devices 26, 26, and the pair of vibration detecting sensors 27, 27. The shape shown in FIGS. 2 and 3 is an example of the shape of the stationary member 36. Instead of fixing it to the support column 37, the stationary member 36 may be directly mounted to the main body 22.

Like the drive device 25, each of the pair of second drive devices 26, 26 is equipped with a coil 40 and a magnet 41. The pair of second drive devices 26, 26 are arranged symmetrically to the right and left of the drive device 25. In this embodiment, the pair of second drive devices 26, 26 are arranged near the apexes of the rising portion and the falling portion of the straight portion 32 of the flow tube 24 and along the flow path center axis of the flow tube 24. The pair of second drive devices 26, 26 and the drive device 25 are arranged in a lateral row along the straight portion 32 of the flow tube 24. Further, they are arranged at predetermined intervals. The coils 40 are mounted to the stationary member 36. Although not specifically shown, an FPC (flexible printed circuit) is led out from the coil 40, and is connected to the board (not shown). The magnets 41 are mounted to the flow tube 24.

The pair of second drive devices 26, 26 are set so as to be driven in phase with each other. Further, the pair of second drive devices 26, 26 and the drive device 25 are set so as to be driven in a reverse phase with each other. When an attracting action is generated in the pair of second drive devices 26, 26, the magnets 41 are inserted into the coils 40. As a result, the flow tube 24 is brought close to the stationary member 36 (at this time, a repelling action is generated in the drive device 25). In contrast, when a repelling action is generated in the pair of second drive devices 26, 26, the flow tube 24 is moved away from the stationary member 36 (at this time, an attracting action is generated in the drive device 25). Like the drive device 25, the pair of second drive devices 26, 26 are structured so as to alternately drive the flow tube 24 in the rotating direction.

As stated above, the pair of vibration detecting sensors 27, 27 are structured so as to detect a phase difference which is proportional to the Coriolis forces acting on the flow tube 24, each of which is equipped with a coil 42 and a magnet 43 (to form a velocity detection system). Further, the pair of vibration detecting sensors 27, 27 are arranged symmetrically to the right and left of the drive device 25. In this embodiment, the pair of vibration detecting sensors 27, 27 are arranged between the left-hand side second drive device 26 and the drive device 25 and between the right-hand side second drive device 26 and the drive device 25. Further, in this embodiment, the pair of vibration detecting sensors 27, 27 are arranged along the flow path center axis of the flow tube 24. In this embodiment, the pair of vibration detecting sensors 27, 27 are arranged at positions deviated from a node generated between a portion corresponding to the left-hand side second drive device 26 and a portion corresponding to the drive device 25 when flow tube 24 is vibrated, and from a node generated between a portion corresponding to the right-hand side second drive device 26 and a portion corresponding to the drive device 25 when flow tube 24 is vibrated.

Each of the coils 42 of the pair of vibration detecting sensors 27, 27 are mounted to the stationary member 36. Although not specifically shown, an FPC (flexible printed circuit) is led out from each of the coils 42 of the pair of vibration detecting sensors 27, 27 and connected to the board (not shown). Each of the magnets 43 of the pair of vibration detecting sensors 27, 27 are mounted to the flow tube 24.

In the Coriolis flowmeter according the second embodiment of the present invention, the respective coils 34, 40 and 42 of the pair of second drive devices 26, 26, the drive device 25, and the pair of vibration detecting sensors 27, 27 have an appropriate weight and also require wiring of an FPC, so they are mounted at predetermined positions on the stationary member 36. By mounting coils at predetermined positions on the stationary member 36 as described above, in the Coriolis flowmeter according the second embodiment of the present invention, the influence on the vibration of the flow tube 24 is mitigated as much as possible.

It is to be noted that, in the Coriolis flowmeter according the second embodiment of the present invention, it is also possible to adopt a structure in which the mounting of the coils and the magnets are reversed (i.e., the coils are mounted to the flow tube 24 and the magnets are mounted to the stationary member 36) or alternated (e.g., the coil of the drive device 25 is mounted to the stationary member 36 and the magnet of the drive device 25 is mounted to the flow tube 24, or, conversely, the coils of the pair of second drive devices 26, 26 are mounted to the flow tube 24 and the magnets of the pair of second drive devices 26, 26 are mounted to the stationary member 36, etc.). Although not specifically shown, in mounting the magnets to the flow tube 24, a dedicated mounting member is used.

In the Coriolis flowmeter according the second embodiment of the present invention, a temperature sensor (not shown) for temperature compensation of the Coriolis flowmeter 21 is mounted to the flow tube 24 with appropriate means. To be more specific, the temperature sensor (not shown) is mounted, for example, near the portion fixed to the inflow port side connecting portion 28. The FPC (flexible printed circuit) or the electric wire led out from the temperature sensor is connected to the board.

In the Coriolis flowmeter of the first embodiment and Coriolis flow meter of the second embodiment according to the present invention, when measurement fluid is caused to flow through the flow tube 3 (the flow tube 24), and the drive device 4 and the pair of second drive devices 5, 5 (the drive device 25 and the pair of second drive devices 26, 26) are driven such that attracting/repelling actions are alternately repeated in succession, the pair of second drive devices 5, 5 (the pair of second drive devices 26, 26) are driven in phase with each other, and the pair of second drive devices 5, 5 (the pair of second drive devices 26, 26) and the drive device 4 (the drive device 25) are driven in a reverse phase with each other. The pair of second drive devices 5, 5 (the pair of second drive devices 26, 26) and the drive device 4 (the drive device 25) are driven, so, as indicated by the solid line and the dashed line of FIG. 5, the flow tube 3 (the flow tube 24) makes a bending vibration with a vibration beam in a tertiary vibration mode.

Figure 5:
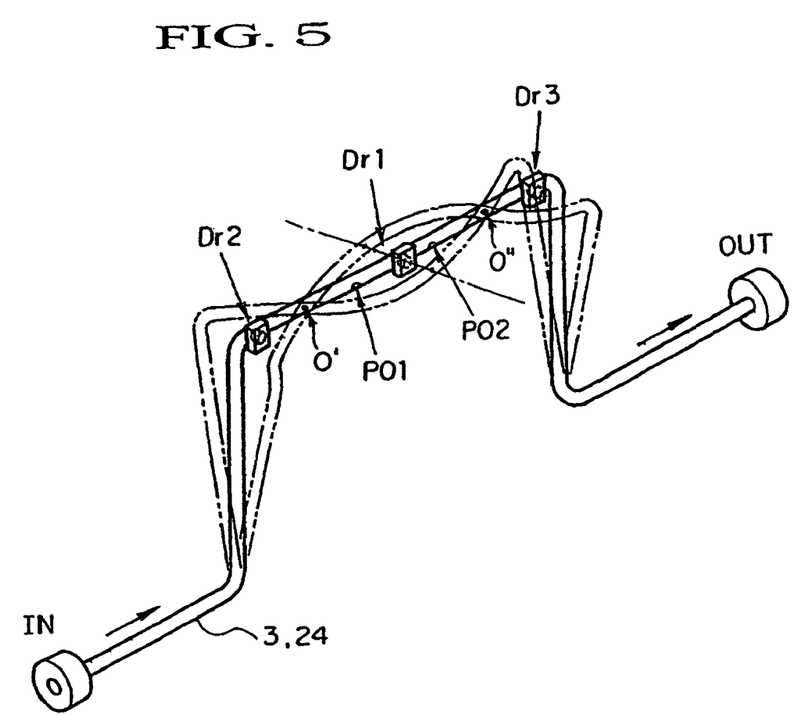
FIG. 5 is a diagram schematically illustrating operation of the flow tube.

In FIG. 5, a point Dr1 indicates the arrangement of the drive device 4 (the drive device 25), points Dr2 and Dr3 indicate the arrangement of the pair of second drive devices 5, 5 (the pair of second drive devices 26, 26), and points PO1 and PO2 indicate the arrangement of the pair of vibration detecting sensors 6, 6 (the pair of vibration detecting sensors 27, 27). Points O' and O" indicate vibration nodes.

Figure 6:
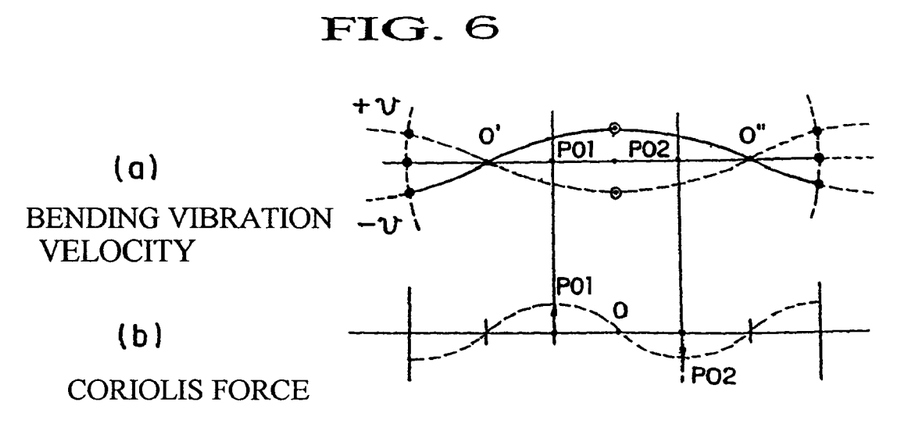
FIG. 6(a) is a diagram showing a bending vibration velocity of the flow tube of FIG. 5.
FIG. 6(b) is a diagram showing a Coriolis force of the flow tube at a point where a pair of vibration detecting sensors of FIG. 6(a) are arranged.

FIG. 6(a) shows the bending vibration velocity of the flow tube 3 (the flow tube 24) vibrating as described above. In FIG. 6(b), the Coriolis forces at points PO1 and PO2 are indicated by arrows in correspondence with the pair of vibration detecting sensors 6, 6 (the pair of vibration detecting sensors 27, 27) shown in FIG. 6(a).

It is to be noted that from the difference in Coriolis forces between points PO1 and PO2 (PO1-PO2), the mass flow rate is calculated (output signals from the pair of vibration detecting sensors 6, 6 (the pair of vibration detecting sensors 27, 27) are converted to position signals by a converter (not shown) to obtain the phase difference and display the mass flow rate).

As described above with reference to FIGS. 1 through 6, each of the Coriolis flowmeter 1 of the first embodiment of the present invention and the Coriolis flowmeter 21 of the second embodiment of the present invention, has a simple shape and can be provided at relatively low cost; it is driven in a tertiary vibration mode, so it is also advantageously resistant to disturbance vibration. Further, in the Coriolis flowmeter 1 and the Coriolis flowmeter 21 of the present invention, as compared with a mass flowmeter (a conventional mass flowmeter) in which no such pair of second drive devices 5, 5 (pair of second drive devices 26, 26) as used in the present invention exist and in which only the drive device 4, (the drive device 25) is used, the vibration of the flow tube 3 (the flow tube 24) is advantageously far more stabilized. Thus, it is advantageously possible to obtain stable signals through the pair of vibration detecting sensors 6, 6 (the pair of vibration detecting sensors 27, 27).

Next, a Coriolis flowmeter according to still another embodiment of the present invention will be described with reference to FIG. 7.

Figure 7:
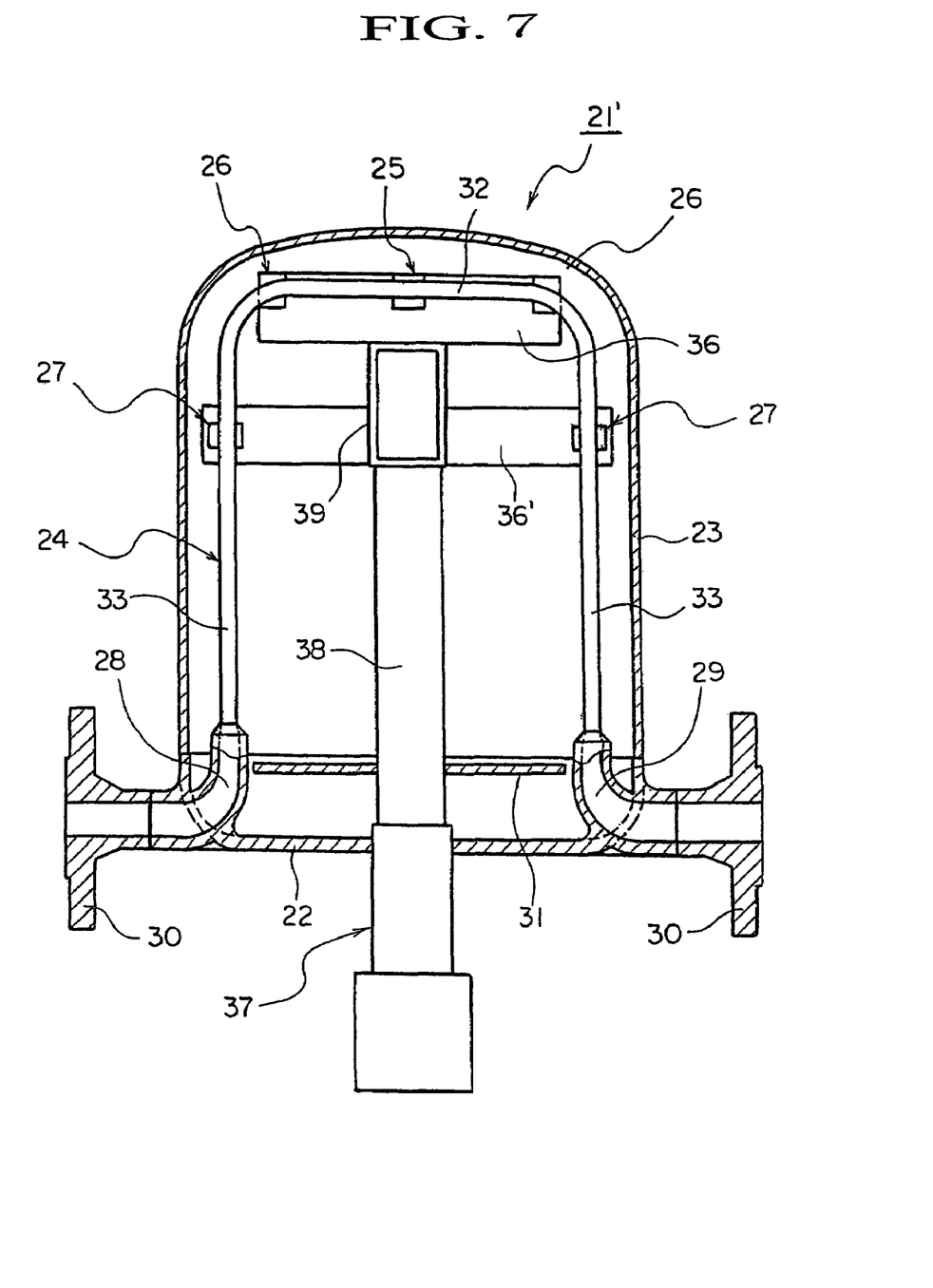
FIG. 7 is a front view of a Coriolis flowmeter according to still another embodiment of the present invention, in which a single bent tube type flow tube is mounted in a vertical plane.

FIG. 7 shows a Coriolis flowmeter according to a third embodiment of the present invention.

Of the drawings, FIG. 7 is a front view of a Coriolis flowmeter according to an embodiment of the present invention, in which a single bent tube type flow tube is mounted in a vertical plane.

In FIG. 7, a Coriolis flowmeter 21' of the third embodiment of the present invention only differs from the Coriolis flowmeter 21 of the second embodiment described above in the arrangement of the pair of vibration detecting sensors 27. That is, in the Coriolis flowmeter of the third embodiment of the present invention, the pair of vibration detecting sensors 27, 27 are arranged between the left-hand side second drive device 26 and the inflow port on the left-hand side of the flow tube 24 and between the right-hand side second drive device 26 and the outflow port on the right-hand side of the flow tube 24.

The respective coils of the pair of vibration detecting sensors 27, 27 are mounted to a stationary member 36', which is fixed, for example, to the board fixing portion 39. The FPC (flexible printed circuit) led out from each of the coils of the pair of vibration detecting sensors 27, 27 is connected to the board. Further, each of the magnets of the pair of vibration detecting sensors 27, 27 is mounted to the flow tube 24 through the intermediation of mounting members. Like the Coriolis flowmeter 1 of the first embodiment and the Coriolis flowmeter 21 of the second embodiment described above, the Coriolis flowmeter 21' with the above structure can be advantageously provided in a simple structure and at relatively low cost. Further, in the Coriolis flowmeter 21' of the present invention, as compared with a mass flowmeter (a conventional mass flowmeter) in which no such pair of second drive devices 5, 5 (pair of second drive devices 26, 26) exist and in which only the drive device 4, (the drive device 25) is used, the vibration of the flow tube 3 (the flow tube 24) is advantageously far more stabilized.

Apart from this, it goes without saying that the present invention allows various modifications without departing from the gist of the present invention.

While in the above description the flow tube 3, 24 is formed in a gate-shape, this should not be construed restrictively; it is also possible to adopt a bent tube of an arbitrary shape, such as a U-shaped one. Further, while in the above description only one flow tube 3, 24 is used, this should not be construed restrictively; it is also possible to use two flow tubes arranged in parallel.

The invention claimed is:

1. A Coriolis flowmeter comprising:
   a casing resistant to bending and torsion;
   a stationary member fixed within said casing, said stationary member having a rectangular shape when viewed from above and being formed as a flat plate;

a pair of block-shaped support portions mounted and fixed to said stationary member;

a flow tube including a straight portion and a pair of leg portions, each of said leg portions being connected to a respective end of said straight portion and oriented in a vertical direction, said flow tube being supported by said pair of support portions at respective ends of said pair of leg portions where a flow port is located, said flow tube having a symmetrical shape with respect to a vertical first axis parallel to said pair of leg portions;

a first drive device arranged at a center position of said straight portion of said flow tube so as to be located on said vertical first axis, said first drive device being operable to alternately drive said flow tube in a rotating direction around a horizontal second axis parallel to a horizontal axis connecting positions at which said support portions support said flow tube, said first drive device including one of a coil and a magnet on said flow tube and the other one of a magnet and a coil on said stationary member;

a pair of vibration detecting sensors symmetrically mounted with respect to said first drive device, each of said vibration detecting sensors being located at a respective one of a right side and a left side of said first drive device to detect a phase difference proportional to Coriolis forces acting on said flow tube; and a pair of second drive devices symmetrically mounted with respect to said first drive device, each of said second drive devices being located at a respective one of said right side and said left side of said first drive device in a lateral row along said straight portion of said flow tube, said pair of second drive devices being operable to alternately drive said flow tube in the rotating direction in phase around said horizontal second axis, each of said second drive devices including one of a coil and a magnet on said flow tube and the other one of a magnet and a coil on said stationary member, said pair of second drive devices being driven in a reverse phase with respect to said first drive device so as to make a bending vibration with a vibration beam in a tertiary vibration mode.

2. The Coriolis flowmeter of claim 1, wherein said pair of second drive devices are arranged near apexes of a rising section and a falling section of said straight portion of said flow tube and along a flow path center axis of said flow tube.

3. The Coriolis flowmeter of claim 2, wherein said first drive device and said pair of second drive devices are arranged and designed such that:

when a repelling action is generated by said first drive device, a force acts on the center position of said straight portion of said flow tube in a direction away from said stationary member, and an attracting action is generated by said second drive devices to cause a force acting in a direction in which said flow tube is moved towards said stationary member near the apexes of the rising section and the falling section of said straight portion of said flow tube;

when an attracting action is generated by said first drive device, a force acts on the center position of said straight portion of said flow tube in a direction towards said stationary member, and a repelling action is generated in said second drive devices to cause a force acting in a direction in which said flow tube moves away from said stationary member near the apexes of the rising section and the falling section of said straight portion of said flow tube; and said first drive device and said pair of second drive devices are driven in opposite phases, and said flow tube is alternately driven in the rotating direction due to the opposite phases at the center position of said straight portion of said flow tube and near the apexes of the rising section and the falling section of said straight portion of said flow tube to make the bending vibration with the vibration beam in the tertiary vibration mode.

4. The Coriolis flowmeter of claim 1, wherein said pair of vibration detecting sensors are arranged at a position deviated from a position at which a node is to be generated between a portion of said flow tube whereat an inflow port side second drive device is mounted and a portion of said flow tube whereat said first drive device is mounted, and at a position deviated from a position at which a node is to be generated between a portion of said flow tube whereat an outflow port side second drive device is mounted and a portion of said flow tube whereat said first drive device is mounted.

5. The Coriolis flowmeter of claim 1, wherein said casing comprises:

a main body has an open upper surface and a U-shaped section, an inflow port side connecting portion and an outflow port side connecting portion being connected to a respective end of said main body in a longitudinal direction, said inflow port side connecting portion and said outflow port side connecting portion being formed so as to establish communication between an interior and an exterior of said main body; and a pressure-resistant case having an arcuate-shaped outer periphery and an opening portion mounted to a top surface of said main body, said case having a U-shaped sectional shape and being fixed to said main body.

6. The Coriolis flowmeter of claim 5, wherein said main body is bilge-shaped.

7. The Coriolis flowmeter of claim 5, wherein said case is thin-walled.

8. The Coriolis flowmeter of claim 1, wherein said stationary member is arranged parallel to a plane defined by said straight portion of said flow tube and said pair of leg portions of said flow tube.

9. The Coriolis flowmeter of claim 1, wherein said flow tube is only a single unitary flow tube, and said flowmeter comprises no additional flow tube.

10. The Coriolis flowmeter of claim 1, wherein said flow tube is gate-shaped.

11. The Coriolis flowmeter of claim 1, wherein each of said pair of vibration detecting sensors is mounted on a respective one of said pair of leg portions of said flow tube between an end of said respective one of said leg portions and an adjacent one of said pair of second drive devices.

12. The Coriolis flowmeter of claim 1, wherein each of said pair of vibration detecting sensors is mounted on said straight portion of said flow tube between an adjacent one of said pair of second drive devices and said first drive device.

13. The Coriolis flowmeter of claim 1, wherein each of said pair of leg portions is oriented so as to extend at a right angle from a respective end of said straight portion of said flow tube.

* * * * *